United States Patent
Chen et al.

(10) Patent No.: US 12,367,587 B2
(45) Date of Patent: Jul. 22, 2025

(54) SEGMENTATION USING ZERO VALUE FEATURES IN MACHINE LEARNING

(71) Applicant: FAIR ISAAC CORPORATION, Roseville, MN (US)

(72) Inventors: Yuchen Chen, San Diego, CA (US); Scott Michael Zoldi, San Diego, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 394 days.

(21) Appl. No.: 18/149,504

(22) Filed: Jan. 3, 2023

(65) Prior Publication Data
US 2024/0221164 A1 Jul. 4, 2024

(51) Int. Cl.
*G06T 7/11* (2017.01)
*G06V 10/75* (2022.01)
*G06V 10/771* (2022.01)
*G06V 40/20* (2022.01)

(52) U.S. Cl.
CPC .............. *G06T 7/11* (2017.01); *G06V 10/751* (2022.01); *G06V 10/771* (2022.01); *G06V 40/20* (2022.01); *G06T 2207/20081* (2013.01)

(58) Field of Classification Search
CPC ............ G06T 7/11; G06T 2207/20081; G06V 10/751; G06V 10/771; G06V 40/20
See application file for complete search history.

(56) References Cited

U.S. PATENT DOCUMENTS

| | | | | |
|---|---|---|---|---|
| 11,507,817 | B2 * | 11/2022 | Abdelaziz | G06F 9/30036 |
| 11,574,234 | B2 * | 2/2023 | Zoldi | G06Q 10/06 |
| 11,645,529 | B2 * | 5/2023 | Li | G06N 3/082 |
| | | | | 706/25 |
| 11,960,565 | B2 * | 4/2024 | Shibata | G06N 3/04 |
| 2004/0202357 | A1 * | 10/2004 | Perz | G06T 7/11 |
| | | | | 382/128 |
| 2019/0354895 | A1 * | 11/2019 | Vasudevan | G06N 3/006 |
| 2020/0134682 | A1 * | 4/2020 | Sethi | G06F 16/51 |
| 2020/0250842 | A1 * | 8/2020 | Lee | G06T 1/20 |
| 2020/0364497 | A1 * | 11/2020 | Hartmann | G06V 10/771 |
| 2020/0380409 | A1 * | 12/2020 | Seo | G06N 20/00 |
| 2021/0020304 | A1 * | 1/2021 | Bakhshinejad | G06T 7/62 |
| 2021/0089882 | A1 * | 3/2021 | Sun | G06N 3/045 |
| 2021/0201956 | A1 * | 7/2021 | Stephens | G06Q 30/0641 |

(Continued)

FOREIGN PATENT DOCUMENTS

WO WO-2024163415 A1 * 8/2024 ............ G06N 3/045

*Primary Examiner* — Mia M Thomas

(57) ABSTRACT

A method includes generating a plurality of binary feature maps containing a set of feature map values including a first binary value and/or a second binary value, by at least converting each input value of a set of input values of a plurality of input feature vectors to the first binary value when the corresponding input value is the zero value or the second binary value when the corresponding input value is the non-zero value. The method includes segmenting the plurality of binary feature maps into a plurality of segments representing behavior profiles. Each segment includes at least one subsegment in which the set of feature map values is the same for all binary feature maps in the at least one subsegment. The method includes predicting, based on a segment of the plurality of segments, a specific outcome. Related methods and articles of manufacture are also disclosed.

20 Claims, 9 Drawing Sheets

(56) References Cited

U.S. PATENT DOCUMENTS

| | | | |
|---|---|---|---|
| 2022/0215580 A1* | 7/2022 | Gupta | G06V 10/82 |
| 2022/0237767 A1* | 7/2022 | Okuno | B23Q 17/2409 |
| 2022/0270357 A1* | 8/2022 | Goyal | G06T 7/194 |
| 2022/0343561 A1* | 10/2022 | Aggarwal | G06T 7/90 |
| 2022/0392077 A1* | 12/2022 | Tran | G06T 7/174 |
| 2023/0047748 A1* | 2/2023 | Li | G06T 5/60 |
| 2023/0080851 A1* | 3/2023 | Zoldi | G06N 3/045 |
| | | | 706/15 |
| 2023/0281961 A1* | 9/2023 | Fazlali | G06V 10/82 |
| | | | 382/103 |
| 2023/0394888 A1* | 12/2023 | Waagen | G06Q 10/20 |
| 2024/0127418 A1* | 4/2024 | Decker | G06T 7/0004 |
| 2024/0202516 A1* | 6/2024 | Zoldi | G06N 3/08 |
| 2024/0267239 A1* | 8/2024 | Zoldi | H04L 9/50 |
| 2024/0303837 A1* | 9/2024 | Lee | G06N 3/045 |
| 2024/0378422 A1* | 11/2024 | Zoldi | G06N 3/08 |
| 2025/0030811 A1* | 1/2025 | Kudekar | G06T 7/11 |

* cited by examiner

700

RECEIVING A PLURALITY OF INPUT VECTORS CONTAINING A SET OF INPUT VALUES
702

GENERATING A PLURALITY OF BINARY FEATURE MAPS CONTAINING A SET OF FEATURE MAP VALUES INCLUDING A FIRST BINARY VALUE AND/OR A SECOND BINARY VALUE
704

SEGMENTING THE PLURALITY OF BINARY FEATURE MAPS INTO A PLURALITY OF SEGMENTS REPRESENTING BEHAVIOR PROFILES
706

PREDICTING A BEHAVIOR PROFILE REPRESENTING A SPECIFIC OUTCOME BASED ON A SEGMENT OF THE PLURALITY OF SEGMENTS
708

FIG. 7

| | LAUC at 0.10% false positive rate | Relative Improvement | LAUC at 0.01% false positive rate | Relative Improvement |
|---|---|---|---|---|
| Global statistics | 0.83e-05 | 179% | 2.47e-07 | 81% |
| Merged segment | 2.32e-05 | | 4.47e-07 | |

SEGMENTATION USING ZERO VALUE FEATURES IN MACHINE LEARNING

FIELD

The present disclosure generally relates to machine learning and more specifically to segmentation based on zero value features.

BACKGROUND

In machine learning models, features are created to represent the information of certain domains and scenarios. Such features often correspond to zero values. For example, a feature relating to a behavior may have zero value in the absence of the behavior, such as when an associated entity does not partake in the behavior. However, zero values are often neglected, or are improperly accounted for in variable value distributions such that the zero values heavily shift relevant statistics related to the value distributions. As a result, conventional models provide inconsistent and unreliable predictions of certain behaviors, inaccurate statistics, and high false positive rates.

SUMMARY

Methods, systems, and articles of manufacture, including computer program products, are provided for segmentation using zero value features in machine learning. In one aspect, there is provided a system. The system may include at least one processor and at least one memory. The at least one memory may store instructions that result in operations when executed by the at least one processor. The operations may include: receiving a plurality of input feature vectors containing a set of input values. Each input value of the set of input values corresponds to a behavior, and each input value of the set of input values is a zero value indicating an absence of the corresponding behavior or a non-zero value indicating a presence of the corresponding behavior. The operations may include generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value. The operations may include segmenting the plurality of binary feature maps into a plurality of segments representing behavior profiles. Each segment of the plurality of segments includes at least one subsegment in which the set of feature map values is the same for all binary feature maps in the at least one subsegment. The operations may include predicting, based on a segment of the plurality of segments, a behavior profile representing a specific outcome.

In another aspect, a computer-implemented method includes receiving a plurality of input feature vectors containing a set of input values. Each input value of the set of input values corresponds to a behavior, and each input value of the set of input values is a zero value indicating an absence of the corresponding behavior or a non-zero value indicating a presence of the corresponding behavior. The method may include generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value. The method may include segmenting the plurality of binary feature maps into a plurality of segments representing behavior profiles. Each segment of the plurality of segments includes at least one subsegment in which the set of feature map values is the same for all binary feature maps in the at least one subsegment. The method may include predicting, based on a segment of the plurality of segments, a behavior profile representing a specific outcome.

In another aspect, there is provided a computer program product including a non-transitory computer readable medium storing instructions. The instructions may cause operations may executed by at least one data processor. The operations may include: receiving a plurality of input feature vectors containing a set of input values. Each input value of the set of input values corresponds to a behavior, and each input value of the set of input values is a zero value indicating an absence of the corresponding behavior or a non-zero value indicating a presence of the corresponding behavior. The operations may include generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value. The operations may include segmenting the plurality of binary feature maps into a plurality of segments representing behavior profiles. Each segment of the plurality of segments includes at least one subsegment in which the set of feature map values is the same for all binary feature maps in the at least one subsegment. The operations may include predicting, based on a segment of the plurality of segments, a behavior profile representing a specific outcome.

In some variations, one or more features disclosed herein including the following features can optionally be included in any feasible combination of the system, method, and/or non-transitory computer readable medium.

In some variations, the segmenting includes: determining whether a first subsegment of the at least one subsegment includes a first quantity of binary feature maps meeting a threshold quantity.

In some variations, the first subsegment defines a segment of the plurality of segments when the first quantity of binary feature maps meets the threshold quantity.

In some variations, the segmenting further includes: determining the first quantity of binary feature maps fails to meet the threshold quantity and generating a merged segment defining a segment of the plurality of segments by at least merging the first subsegment and at least one second subsegment of the at least one subsegment until a total quantity of binary feature maps in the merged segment meets the threshold quantity.

In some variations, the at least one second subsegment is selected based on a distance between the at least one second subsegment and the first subsegment based on the feature map values.

In some variations, the distance indicates a quantity of differing feature map values between the first subsegment and the at least one second subsegment. The at least one second subsegment is selected such that the distance is minimized.

In some variations, the at least one second subsegment is selected such that a quantity of shared feature map values is a maximum quantity relative to first subsegment and the second subsegment share a maximum quantity of feature map values.

In some variations, the distance is determined based on an exclusive or operation.

In some variations, the threshold quantity is generated based on a target rate.

In some variations, the threshold quantity is a multiple of an inverse of the target rate.

In some variations, the plurality of input feature vectors are associated with different entities.

In some variations, the predicting includes training, based at least on the binary feature maps included in the segment, a machine learning model to predict the specific outcome.

In some variations, the machine learning model is an unsupervised machine learning model.

In some variations, the behavior is a transactional behavior and the predicted specific outcome includes a negative entity transaction behavior of an entity.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to segmentation using zero value features in machine learning, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts a flowchart illustrating an example of a process for segmentation using zero value features, consistent with implementations of the current subject matter;

Figure 1:
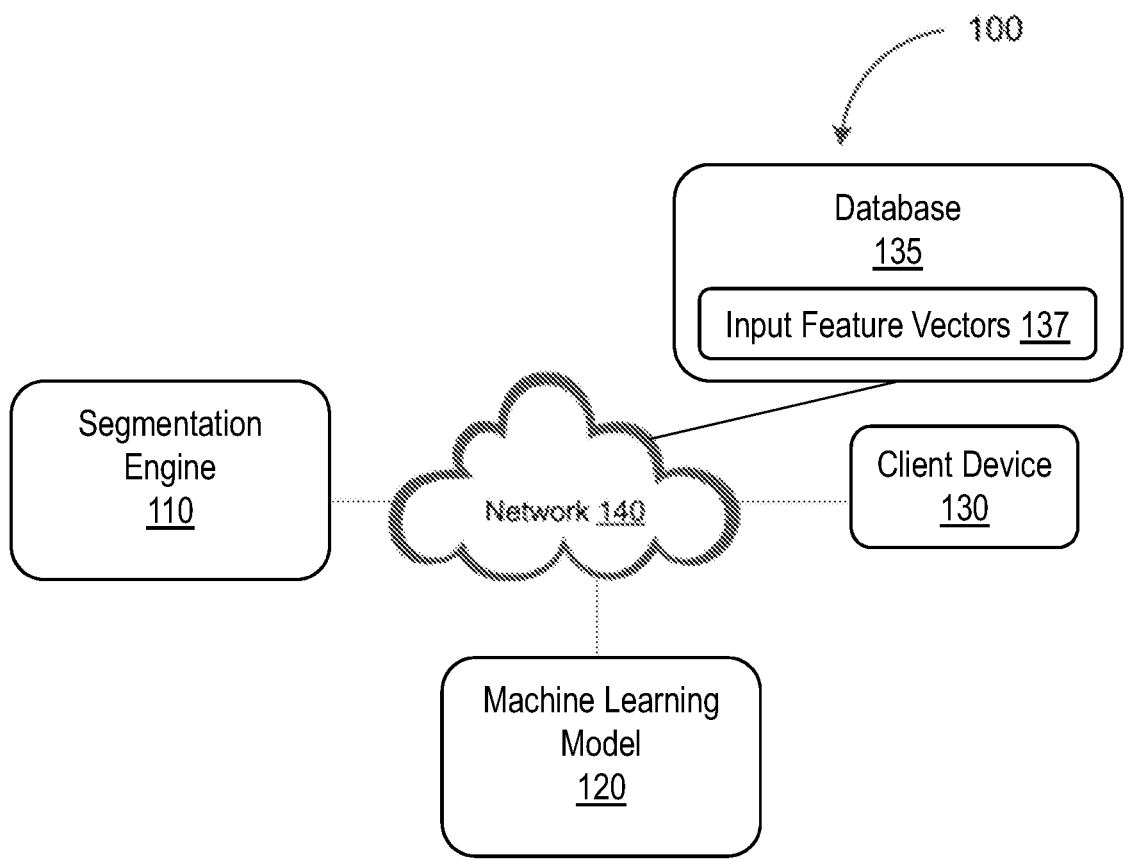
FIG. 1 depicts an example segmentation system, consistent with implementations of the current subject matter.

When practical, like labels are used to refer to same or similar items in the drawings.

DETAILED DESCRIPTION

In machine learning models, features are created to represent the information of certain domains and scenarios. Unsurprisingly, data may include zero values corresponding to those features. For example, a feature relating to a behavior may have zero value in the absence of the behavior, such as when an associated entity does not partake in the behavior. As noted, zero values are often neglected, or are improperly accounted for in variable value distributions such that the zero values heavily shift relevant statistics related to the value distributions. For example, when zero values are included in calculations for z-scaling, the mean and standard deviation of a feature will be heavily shifted to zero, reducing the information value. Accordingly, incorporating the magnitude of the zero values determinations can inaccurately skew behavioral statistics, resulting in unreliable predictions as to whether an entity is engaging in a negative behavior or event, such as a diversion of medication, fraud, money laundering, and/or the like. Further, relying on global statistics generated based on an entire population of entities may also lead to unreliable predictions as to whether an entity is engaging in a negative behavior or event.

Generally, as noted above, zero values represent the absence of a behavior as opposed to non-zero values, which represent the presence of the behavior. Consistent with implementations of the current subject matter, zero values can be used to define a population for peers sharing the similar absence of the behavior. Rather than incorporating the zero numeric value of the zero value features, the zero values may be explicitly considered and used to segment entities, resulting in denoised and improved statistics. It should be appreciated that this may apply at many dimensions. For example, zero values may represent an absence of medication withdrawals within one month, an absence of cash-transactions in 30-days, an absence of international transactions in one month, and/or the like. By segmenting the entities based on zero or non-zero value behavior, the segmentation system described herein considers zero value features as part of a binary value feature map, in which features are indicated as being either zero or non-zero.

Segmentation based on zero values in a high number of dimensions generates improved statistics. While there can be a risk of peer groups being too small to provide meaningful statistics in both supervised and unsupervised models, the segmentation system consistent with implementations of the current subject matter segments a population of entities in a manner that mitigates this risk. For example, the segmentation system described herein ensures that each segment includes a sufficient quantity of binary value feature maps and/or entities, generating robust statistics for the representative population of behavior-similar entities based on the zero and/or non-zero value feature dimension and the observed population rate. Accordingly, the segmentation system described herein generates superior unsupervised model detection at low false positive rates for medication diversion machine learning models, financial crime machine learning models (e.g. fraud detection and anti-money laundering detection), and/or the like, such as relative to models using global statistics per feature.

Consistent with implementations of the current subject matter, the segmentation system described herein automates segmentation to provide robust statistics by generating statistics from segments (e.g., populations) having similar behaviors, thus improving machine learning model training and prediction of certain behaviors, such as negative events. In some implementations, an input feature vector is converted into a binary feature map containing binary bits, where a first binary value (e.g., zero) represents zero values and a second binary value (e.g., one) represents non-zero values for all features of the input feature vector. The segmentation system generates peer-like segments or subsegments based on the binary feature map of the input feature vector. For example, the peer-like subsegments may include all binary feature maps having the same set of feature map values (e.g., the same set of first binary values and/or second binary values).

This approach may be unsupervised, relying on features having zero values. Based on this unsupervised approach, the resulting generated subsegments could be voluminous in the number of subsegments. In some instances, such subsegments may have an insufficient quantity of binary feature maps corresponding to the input feature vectors associated with each entity that results in unreliable statistics. To ensure segments include a sufficient quantity of binary feature maps to provide improved and robust statistics, the segmentation system described herein may recursively merge the closest-peer subsegments based on a distance between subsegments until all segments, including at least one subsegment, meets a minimum segment size.

Consistent with implementations of the current subject matter, the minimum segment size may be determined based on a target rate. The target rate may be measured or predetermined based on a behavior profile and/or a specific outcome, such as a negative event including medication diversion, fraud, money laundering, credit risk default, and/or the like. As described herein, the minimum segment size can be determined by, for example, interpolating based on a multiple of the overall target rate. Merging subsegments so that each segment meets the minimum segment size offers benefits in various applications including the detection of medication diversion, fraud, money laundering, credit risk default, and/or the like.

Accordingly, the segmentation system described herein leverages zero values in an input feature vector to automate the segmentation of entities through determining segments of similar entities exhibiting the same zero and non-zero behaviors in their input feature vectors, and by setting a minimum segment size, based at least on a target rate, generating more predictive models in scenarios, such as when appropriate segmentation is unknown (e.g., in unsupervised machine learning models). The segmentation system described herein provides a cleaner segmentation where statistical distribution is relevant to behavior-similar peer subsegments with sufficient sample size. The segmentation system consistent with implementations of the current subject can be used to improve modeling, mean and/or standard deviation estimation, quantile estimation, and supervised and unsupervised training of machine learning models. The segmentation system described herein may not rely on the actual data of the dataset other than the zero or non-zero value and/or an estimate of the target rate. The segmentation system described herein may be applied to any dataset in any domain to determine relevant and statistically supported segments to improve detection of the model (e.g., a machine learning model 120), such as relative to relying on global statistics determined based on an entire population within the dataset.

FIG. 1 depicts a system diagram illustrating an example of a segmentation system 100, consistent with implementations of the current subject matter. Referring to FIG. 1, the segmentation system 100 may include a segmentation engine 110, a machine learning model 120, a database 135, and a client device 130. The segmentation engine 110, the machine learning model 120, the database 135, and the client device 130 may be communicatively coupled via a network 140. The network 140 may be a wired network and/or a wireless network including, for example, a wide area network (WAN), a local area network (LAN), a virtual local area network (VLAN), a public land mobile network (PLMN), the Internet, and/or the like. In some implementations, the segmentation engine 110, the machine learning model 120, the database 135, and/or the client device 130 may be contained within and/or operate on a same device. It should be appreciated that the client device 130 may be a processor-based device including, for example, a smartphone, a tablet computer, a wearable apparatus, a virtual assistant, an Internet-of-Things (IoT) appliance, and/or the like.

The segmentation engine 110 includes at least one data processor and at least one memory storing instructions, which when executed by the at least one data processor, perform one or more operations as described herein. The segmentation engine 110 train the machine learning model 120 based a determined segment including at least one binary feature map corresponding to an input feature vector of an entity. In this way, the machine learning model 120 may be specific to a particular segment or behavioral profile. In other words, the segmentation engine 110 may train the machine learning model 120 based on the segment to predict a behavioral profile-specific outcome (e.g., a negative event), such as a likelihood of medication diversion, fraud, money laundering, credit risk default, and/or the like. This provides improved reliability and accuracy in predicting the behavioral profile-specific outcomes (e.g., negative events). The machine learning model 120 may be an unsupervised machine learning mode. In other implementations, the machine learning model 120 may be a supervised machine learning model.

Referring to FIG. 1, the database 135 stores a plurality of input feature vectors 137 based on which the segmentation engine 110 determines one or more segments and trains a machine learning model. The plurality of input feature vectors 137 may each contain a set of input values. The input values may each correspond to an input feature, such as a behavior or transaction history, such as a medication transaction, including a medication withdrawal at a station in a medication facility, a medication prescription received, a medication prescription provided, and/or the like, within a time period (e.g., one month, etc.), a financial transaction, such as a cash transaction, an ATM withdrawal, an international transaction, a wire transfer, and/or the like, within a time period (e.g., one month, etc.), and/or the like. The plurality of input feature vectors 137 may represent a current state of the behaviors of an entity. For example, the input values contained in each input feature vector may represent a snapshot of the behavior at a particular time point.

Each input feature vector of the plurality of input feature vectors 137 may correspond to an entity. For example, each entity may be associated with a particular input feature vector. In some implementations, the plurality of input feature vectors 137 includes one or more input feature vectors corresponding to each entity. For example, in some implementations, at least some of the plurality of input feature vectors 137 may be associated with a single entity, such as at various time points. Additionally and/or alternatively, each input feature vector of the plurality of input feature vectors 137 is associated with a different entity.

Figure 2:
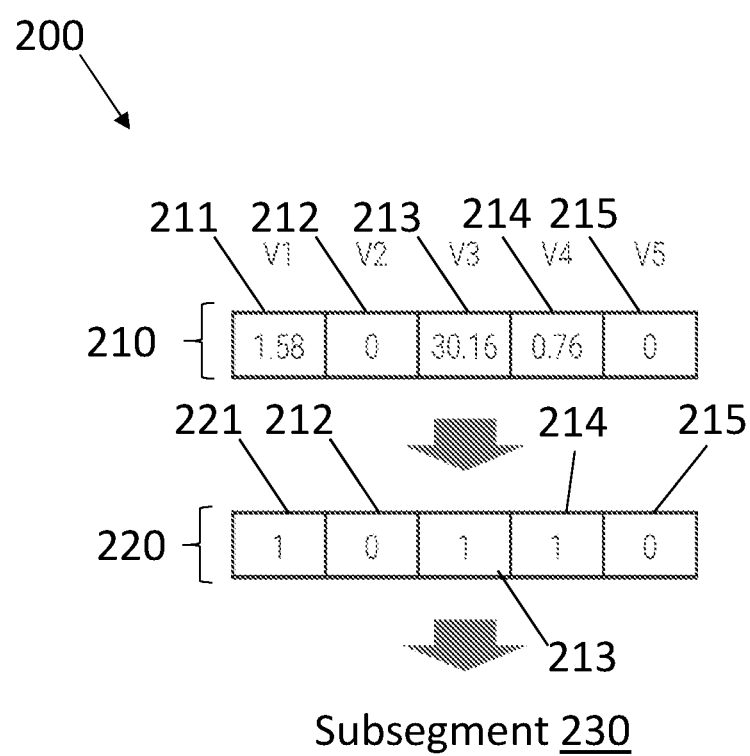
FIG. 2 depicts an example process for generating a subsegment, consistent with implementations of the current subject matter.

FIG. 2, which illustrates an example process 200 for generating a subsegment 230, depicts an example input feature vector 210 of the plurality of input feature vectors 137, consistent with implementations of the current subject matter. The input feature vector 210 may include a first input value 211 corresponding to a first input feature or behavior, a second input value 212 corresponding to a second input feature or behavior, a third input value 213 corresponding to a third input feature or behavior, a fourth input value 214 corresponding to a fourth input feature or behavior, and a fifth input value 215 corresponding to a fifth input feature or behavior. While the input feature vector 210 is depicted as including five input features, the input feature vector 210 may include any number of input features.

The input values contained in the input feature vector 210 may be a numeric value, such as a zero value or a non-zero value. For example, in the example input feature vector 210 shown in FIG. 2, the first input value 211, the third input value 213, and the fourth input value 214 have non-zero values (e.g., 1.58, 30.16, and 0.76, respectively). The second input value 212 and the fifth input value 215 of the input feature vector 210 shown in FIG. 2 have zero values.

The second input value 212 and the fifth input value 215 having zero values indicate an absence of the corresponding behavior. In other words, the second input value 212 and the fifth input value 215 having zero values indicates that the entity associated with the input feature vector 210 has not engaged in the input feature or behavior associated with the second input value 212 and the input feature or behavior associated with the fifth input value 215. Further, the first input value 211, the third input value 213, and the fourth input value 214 having non-zero values indicate a presence of the corresponding behavior. In other words, the first input value 211, the third input value 213, and the fourth input value 214 having non-zero values indicates that the entity associated with the input feature vector 210 has engaged in the input feature or behavior associated with the first input value 211, the input feature or behavior associated with the third input value 213, and the input feature or behavior associated with the fourth input value 214. In this example, the first input value 211 was assigned a numeric value of 1.58, the third input value 213 was assigned a numeric value of 30.16, and the fourth input value 214 was assigned a numeric value of 0.76.

The segmentation engine 110 may retrieve or otherwise receive the plurality of input feature vectors 137, such as from the database 135. The segmentation engine 110 may categorize the entity behavior in a feature vector space based on the zero and non-zero numeric values of the input values contained in the plurality of input feature vectors 137. For example, the segmentation engine 110 may generate a plurality of binary feature maps containing a set of feature map values based on the plurality of input feature vectors 137 (e.g., the input values contained in the plurality of input feature vectors 137).

FIG. 2 illustrates an example depicts an example binary feature map 220 of the plurality of binary feature maps generated for a corresponding input feature vector of the plurality of input feature vectors 137. As shown in FIG. 2, the binary feature map 220 includes a plurality of feature map values, such as a first feature map value 221, a second feature map value 222, a third feature map value 223, a fourth feature map value 224, and a fifth feature map value 225. The first feature map value 221 corresponds to the first input value 211 of the input feature vector 210, the second feature map value 222 corresponds to the second input value 212 of the input feature vector 210, the third feature map value 223 corresponds to the third input value 213 of the input feature vector 210, the fourth feature map value 224 corresponds to the fourth input value 214 of the input feature vector 210, and the fifth feature map value 225 corresponds to the fifth input value 215 of the input feature vector 210. While the binary feature map 220 is depicted as including five feature map values, the binary feature map 220 may include any number of feature map values corresponding to the input features of the input feature vector.

The binary feature map 220 may include a plurality of binary bits, including a first binary value (e.g., 0) representing input values of the input feature vector 210 of the plurality of input feature vectors 137 having zero numeric values and/or a second binary value (e.g., 1) representing input values of the input feature vector 210 of the plurality of input feature vectors 137 having non-zero numeric values. For example, the segmentation engine 110 may generate the binary feature map 220 (e.g., the plurality of binary feature maps) by at least converting each input value of the set of input values of the plurality of input feature vectors to the first binary value (e.g., 0) when the corresponding input value is a zero numeric value or the second binary value (e.g., 1) when the corresponding input value is a non-zero numeric value.

Referring to the example binary feature map 220 shown in FIG. 2, the first feature map value 221 includes the second binary value (e.g., 1), the second feature map value 222 includes the first binary value (e.g., 0), the third feature map value 223 includes the second binary value (e.g., 1), the fourth feature map value 224 includes the second binary value (e.g., 1), and the fifth feature map value 225 includes the first binary value (e.g., 0).

The segmentation engine 110 assigns the second binary value to the first feature map value 221 by at least converting the numeric value (e.g., 1.58) of the first input value 211 to the second binary value (e.g., 1), at least because the corresponding numeric value of the first input value 211 is a non-zero numeric value. The segmentation engine 110 assigns the first binary value to the second feature map value 222 by at least converting the numeric value (e.g., 0) of the second input value 212 to the first binary value (e.g., 0), at least because the corresponding numeric value of the second input value 212 is a zero numeric value. The segmentation engine 110 assigns the second binary value to the third feature map value 223 by at least converting the numeric value (e.g., 30.16) of the third input value 213 to the second binary value (e.g., 1), at least because the corresponding numeric value of the third input value 213 is a non-zero numeric value. The segmentation engine 110 assigns the second binary value to the fourth feature map value 224 by at least converting the numeric value (e.g., 0.76) of the fourth input value 214 to the second binary value (e.g., 1), at least because the corresponding numeric value of the fourth input value 214 is a non-zero numeric value. The segmentation engine 110 assigns the first binary value to the fifth feature map value 225 by at least converting the numeric value (e.g., 0) of the fifth input value 215 to the first binary value (e.g., 0), at least because the corresponding numeric value of the fifth input value 215 is a zero numeric value.

Entities with similar behaviors can be grouped together into one segment based on the absence or presence of different behaviors represented by features of each input feature vector and converted into the corresponding binary feature maps. As an example, in an input feature vector, a feature may represent an average quantity of visits to a physician within the last 30 days and another feature may represent an average quantity of purchases at a pharmacy within the last 30 days for an entity. In this example, an entity only making purchases at the pharmacy could have a distinct behavior from a customer only visiting a physician. As another example, a feature may represent an average transaction amount withdrawn from any ATM in the last 30 days, and another feature may represent an average wire amount in the last 30 days. In this example, entities making only ATM transactions could have a distinct behavior from customers who make only wire transactions. Moreover, in this example, customers that do not make any ATM or wire transactions could be further distinct from other customers that make both ATM and wire transactions. Accordingly, the segmentation engine 110 can capture the various combinations of behaviors in one or more subsegments or segments representing distinct behavior profiles.

Once the plurality of binary feature maps for the plurality of input feature vectors 137 is created for the dataset, input feature vectors having the same binary feature map may be grouped together to represent a subsegment. The statistics calculated within a corresponding segment (defined by at least one subsegment) may, as a result, be based on a group of entities with the same behaviors. This results in improved, more accurate, and more reliable predictions by the segmentation system 100, such as compared to conventional models in which global statistics are calculated from a per-feature dimension across the entire population.

For example, the segmentation engine 110 may segment the plurality of binary feature maps, such as the binary feature map 220, generated for each of the plurality of input feature vectors 137. The plurality of binary feature maps may be segmented, by the segmentation engine 110, into a plurality of segments representing behavior profiles. In some implementations, each segment of the plurality of segments may include at least one subsegment. Thus, the segmentation engine 110 may segment the plurality of binary feature maps into a plurality of subsegments such that each subsegment includes at least one binary feature map of the plurality of feature maps. In each subsegment, the set of feature map values is the same for all binary feature maps. In other words, all of the at least one binary feature map included in a particular subsegment has the same set of feature map values.

Figure 3:
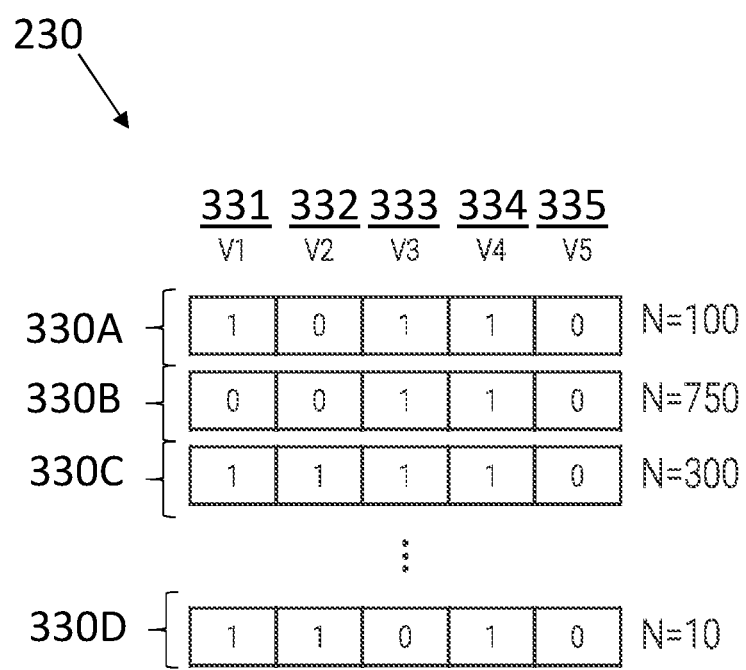
FIG. 3 depicts a schematic representation of a plurality of subsegments, consistent with implementations of the current subject matter.

As an example, FIG. 3 illustrates a schematic representation of a plurality of subsegments 230, consistent with implementations of the current subject matter. The plurality of subsegments 230 includes a first subsegment 330A, a second subsegment 330B, a third subsegment 330C, a fourth subsegment 330D, and so on. A quantity of the plurality of subsegments 230 is equal to a quantity of unique binary feature maps generated by the segmentation engine 110.

Referring to FIG. 3, each of the plurality of subsegments 230 may include a first feature map value 331, a second feature map value 332, a third feature map value 333, a fourth feature map value 334, a fifth feature map value 335, and/or the like. In each subsegment, the binary feature maps containing the set of feature map values are the same. In other words, the particular combination of binary values assigned to each of the feature map values are the same within each subsegment. For example, the binary value (e.g., either 0 or 1) assigned to the first feature map value 331, the second feature map value 332, the third feature map value 333, the fourth feature map value 334, and the fifth feature map value 335 are the same for each binary feature map within the first subsegment 330A. Similarly, the binary value (e.g., either 0 or 1) assigned to the first feature map value 331, the second feature map value 332, the third feature map value 333, the fourth feature map value 334, and the fifth feature map value 335 are the same for each binary feature map within the second subsegment 330B, the binary value (e.g., either 0 or 1) assigned to the first feature map value 331, the second feature map value 332, the third feature map value 333, the fourth feature map value 334, and the fifth feature map value 335 are the same for each binary feature map within the third subsegment 330C, and the binary value (e.g., either 0 or 1) assigned to the first feature map value 331, the second feature map value 332, the third feature map value 333, the fourth feature map value 334, and the fifth feature map value 335 are the same for each binary feature map within the fourth subsegment 330D, and so on.

The segmentation engine 110 may determine a segment size for each subsegment (e.g., the first subsegment 330A, the second subsegment 330B, the third subsegment 330C, the fourth subsegment 330D, and so on) of the plurality of subsegments 230. The plurality of subsegments 230 may have a segment size equal to a quantity of binary feature maps containing the same combination of feature map values included in each subsegment. In the example shown in FIG. 3, the first subsegment 330A has a segment size N of 100, the second subsegment 330B has a segment size N of 750, the third subsegment 330C has a segment size N of 300, and the fourth subsegment 330D has a segment size N of 10.

As noted, the segmentation engine 110 may generate a segment representing a behavior profile. The segment may include at least one subsegment. The segmentation engine 110 may determine how many and/or which subsegments to include in each segment based at least on the segment size of each subsegment. For example, the segmentation engine 110 may generate the segment by at least determining whether a first subsegment (e.g., the first subsegment 330A, the second subsegment 330B, the third subsegment 330C, the fourth subsegment 330D, and so on) of the at least one subsegment 230 includes a first quantity (e.g., a segment size) of binary feature maps meeting a threshold quantity (e.g., a minimum segment size).

The segmentation engine 110 may determine the segment size (e.g., quantity of included binary feature maps) of the first subsegment meets (e.g., is greater than or equal to) the minimum segment size (e.g., threshold quantity). The segmentation engine 110 defines the first subsegment as a segment when the segment size of the first subsegment meets the minimum segment size. In other words, when the segment size of a subsegment is sufficiently large (e.g., meets the minimum segment size), the segmentation engine 110 may define the segment as including only the subsegment. In that case, the segment size of the subsegment is sufficiently large such that the quantity of binary feature maps included in the subsegment is sufficient to provide a meaningful statistical distribution and is representative of a unique behavior profile.

As an example, the minimum segment size may be N=500. Referring to the example shown in FIG. 3, the segmentation engine 110 may determine the segment size (N=750) of the second subsegment 330B meets (e.g., is greater than or equal to) the minimum segment size (e.g., threshold quantity) of N=500. As a result, the segmentation engine 110 defines the second subsegment 330B as a unique segment, since the segment size of the second subsegment 330B meets the minimum segment size.

In some implementations, the segmentation engine 110 determines the segment size (e.g., quantity of included binary feature maps) of the first subsegment fails to meet (e.g., is less than) the minimum segment size (e.g., threshold quantity). This means that the first subsegment includes an insufficient quantity of samples or binary feature maps to provide a meaningful statistical distribution. To address this issue, the segmentation engine 110 may generate a merged subsegment to define a segment. In other words, the segmentation engine 110 generates the merged subsegment based on a determination that the segment size of the first subsegment fails to meet the minimum segment size.

The segmentation engine 110 generates the merged subsegment by at least recursively merging subsegments (e.g., the first subsegment and at least one other subsegment) until a segment size of the merged segment meets the minimum segment size. In other words, the segmentation engine 110 merges the first subsegment with at least one second subsegment until a total quantity of binary feature maps in the merged segment meets the threshold quantity. While some individual segments have different behaviors and the global distribution is an average over these behaviors, merging subsegments ensures a minimum population of entities present in each segment. The individual segment represents entities with identical behavior profiles based on the binary feature maps included in the at least one subsegment defining the segment.

As an example, the minimum segment size may be N=500. Referring to the example shown in FIG. 3 and FIG. 4, the segmentation engine 110 may determine the segment size (N=100) of the first subsegment 330A fails to meet (e.g., is less than) the minimum segment size (e.g., threshold quantity) of N=500. As a result, the segmentation engine 110 generates a merged segment 450 (see FIG. 4) by at least merging (e.g., recursively merging) the first subsegment 330A with at least one other subsegment of the at least one subsegment 230 until a segment size of the merged segment (e.g., a total quantity of binary feature maps in the merged segment) meets the minimum segment size of N=500. In this example, the segmentation engine 110 generates the merged segment 450 by at least merging the first subsegment 330A, which has a segment size of N=100, the third subsegment 330C, which has a segment size of N=300, and a fifth subsegment 330E, which has a segment size of N=110. Thus, the merged segment 450 in this example has a segment size of N=510. In other words, the merged segment 450 includes 510 binary feature maps corresponding to the first subsegment 330A, the third subsegment 330C, and the fifth subsegment 330E, so the segment size of N=510 of the merged segment 450 is greater than the minimum segment size of N=500.

Figure 4:
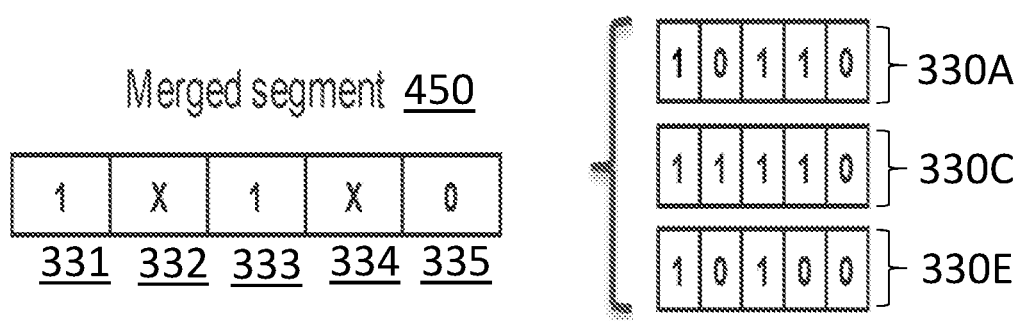
FIG. 4 depicts an example merged segment, consistent with implementations of the current subject matter.

The segmentation engine 110 may generate the larger merged segment by collapsing the binary values corresponding to the mismatched (e.g., different) feature map values of the binary feature maps of the subsegments (e.g., the first subsegment and at least one second subsegment) being merged. For example, FIG. 4 illustrates an example of a merged segment 450, generated by the segmentation engine 110 by at least merging the first subsegment 330A having a binary feature map containing a set of feature map values {1, 0, 1, 1, 0}, the third subsegment 330C having a binary feature map containing a set of feature map values {1, 1, 1, 1, 0}, and the fifth binary feature map containing a set of feature map values {1, 0, 1, 0, 0}.

As noted, in the merged segment 450, the different feature map values across the merged subsegments are collapsed. As shown in FIG. 4, the mismatched feature map values are denoted by "X", resulting in a merged binary feature map containing a set of feature map values {1, X, 1, X, 0} for the merged segment 450. In this example, the second feature map value 332 and the fourth feature map value 334 of the merged segment 450 are collapsed, since the second feature map value 332 and the fourth feature map value 334 differ across the first subsegment 330A, the third subsegment 330C, and the fifth subsegment 330E. Thus, the resulting merged segment 450 has a behavior profile represented by a shared first feature map value 331 (e.g., non-zero value), third feature map value 333 (e.g., non-zero value), and fifth feature map value 335 (e.g., zero value).

In some implementations, the segmentation engine 110 selects the at least one other subsegment to be merged with the first subsegment having an insufficient segment size based on a distance between the first subsegment and the at least one other subsegment. The distance may represent a behavioral similarity between the first subsegment and the at least one other subsegment. The distance may be determined based on an exclusive or (XOR) operation, or other distance metric techniques. The distance may indicate a quantity of differing feature map values between the first subsegment and the at least one other subsegment to be merged. The segmentation engine selects the at least one other subsegment to such that the distance is minimized. Additionally and/or alternatively, the segmentation engine 110 selects the at least one other subsegment to be merged such that the quantity of shared feature map values is a maximum quantity relative to first subsegment and the second subsegment share a maximum quantity of feature map values.

In some implementations, such as in supervised learning models, the segmentation engine 110 may consider an importance and/or weight of one or more input values and/or feature map values when generating the merged segment. For example, the segmentation engine 110 may merge certain subsegments based on the importance and/or weight of one or more input values and/or feature map values. Additionally and/or alternatively, the segmentation engine 110 may determine to not merge two or more subsegments based on an incompatible input value and/or feature map value between the two or more subsegments.

Figure 5:
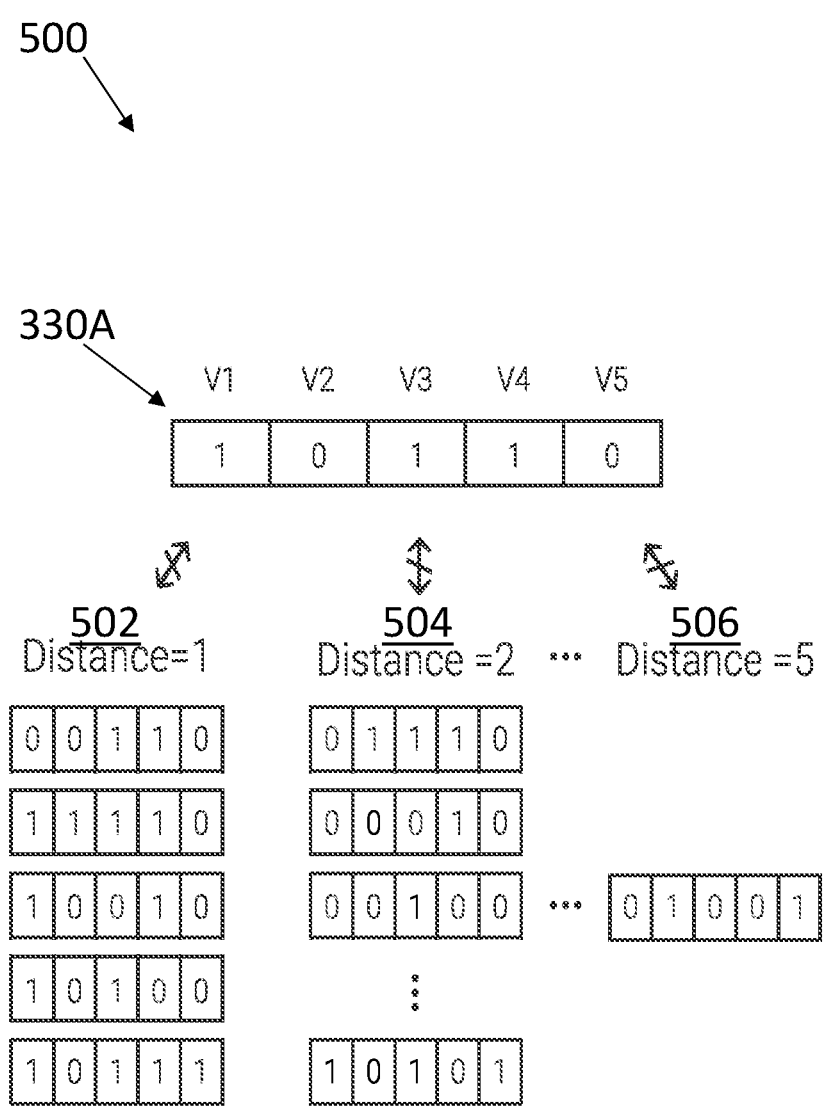
FIG. 5 depicts a schematic representation of example distances between subsegments, consistent with implementations of the current subject matter.

FIG. 5 depicts a schematic representation 500 of example distances between subsegments, consistent with implementations of the current subject matter. For example, the schematic representation 500 shows example subsegments based on a distance from the first subsegment 330A. As shown in FIG. 5, the distance between the first subsegment 330A and subsegments 502 is 1, since only one feature map value is different (e.g., mismatched) between any one of the subsegments 502 and the first subsegment 330A. In other words, the first subsegment 330A shares four feature map values with any one of the subsegments 502.

As shown in FIG. 5, the subsegments 502 includes the third subsegment 330C and the fifth subsegment 330E. Referring back to the example shown in FIG. 4, the segmentation engine 110 selected the third subsegment 330C and the fifth subsegment 330E to be merged with the first subsegment 330A based at least on the distance (e.g., 1) between the first subsegment 330A and each of the third subsegment 330C and the fifth subsegment 330E being minimized and/or the segment size of each of the first subsegment 330A and each of the third subsegment 330C and the fifth subsegment 330E.

Referring back to FIG. 5, the distance between the first subsegment 330A and subsegments 504 is 2, since only two feature map values are different (e.g., mismatched) between any one of the subsegments 504 and the first subsegment 330A. In other words, the first subsegment 330A shares three feature map values with any one of the subsegments 504. Again referring to FIG. 5, the distance between the first subsegment 330A and subsegments 506 is 5, since all feature map values are different (e.g., mismatched) between any one of the subsegments 506 and the first subsegment 330A. In other words, the first subsegment 330A shares no feature map values with any one of the subsegments 506.

The segmentation engine 110 may generally merge the subsegments 502 with the subsegment 330A until the segment size of the merged segment meets the minimum segment size. The segmentation engine 110 may merge the subsegments 502 and at least one of the subsegments 504, and so on, until the segment size of the merged segment meets the minimum segment size.

In some implementations, the minimum segment size (e.g., threshold quantity) is predetermined or dynamically generated. The minimum segment size may be generated based on a target rate, which may be predetermined or dynamically generated. The target rate may be determined by the machine learning model 120. The target rate may be an average number of occurrences within a particular segment. In some implementations, the minimum segment size is generated as a multiple of an inverse of the target rate. For example, in some implementations, the minimum segment size is determined by Equation 1:

$$\text{minimum segment size} = 10^{-floor(log10(target\ rate))}$$

Equation 1

The proper minimum segment size of a segment helps to establish appropriate statistical coverage and improved model performance, and applies both to individual segments and merged segments. The minimum segment size may thus be determined to generate robust statistics based on a target rate of interest. The minimum segment size can thus be estimated in a number of different ways based on the target rate.

Figure 6:
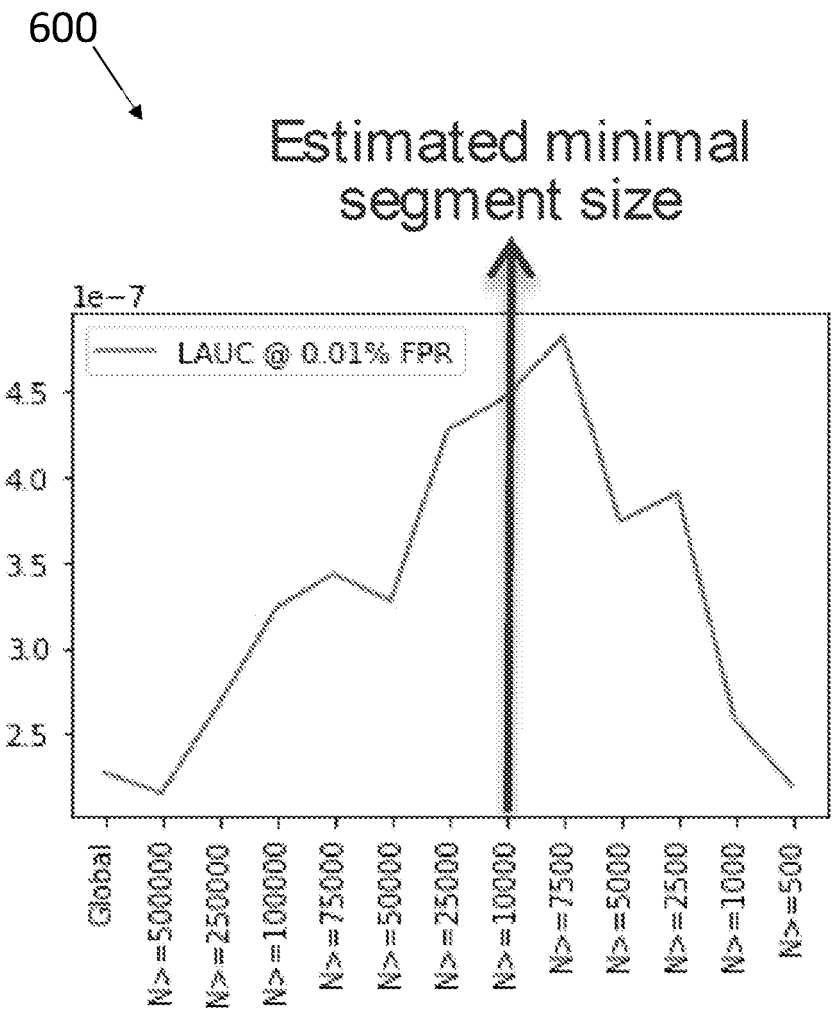
FIG. 6 depicts a plot showing an estimated minimum segment size, consistent with implementations of the current subject matter.

FIG. 6 depicts a graph 600 showing an evaluation of a performance of a machine learning model (e.g., the machine learning model 120), based on the minimum segment size, consistent with implementations of the current subject matter. The performance of the machine learning model at the low false positive rate (FPR) is the primary area of interest in many applications including the detection of behavior profiles predicting specific outcomes, such as negative events including medication diversion, proper handling of medication, fraud, money laundering, and/or the like. The target rate may be the ratio between the number of correctly classified negative events and the total number of actual negative events.

As an example, the graph 600 shows the left-hand area under curve (LAUC) comparison for fraud detection by the machine learning model 120 at false positive rates as a function of minimum segment size, ranging from small to large minimum segment sizes. As shown in the graph 600, the performance of target detection is gradually improved while increasing the minimum segment size for merging. However, the performance may decrease when the minimum segment size is too large, as statistics tend to represent the global statistics, providing less lift as segments lose their distinct behaviors. Accordingly, it is desirable to determine a minimum segment size that allows the segments to maintain their unique behavior profile. Further, as shown in the graph 600, the minimal segment size estimated using Equation 1 would generate model performance near the global maximum across scanned minimum segment sizes, resulting in improved model performance and an increase in LAUC.

Accordingly, the segmentation engine 110 may predict, based on the generated segment of the plurality segments, a behavior profile predicting and/or representing a specific outcome, such as a negative event or negative entity behavior of an entity, including medication diversion, fraud, money laundering, credit risk default, and/or the like. The segmentation engine 110, as described herein, improves model performance in predicting the behavior profile predicting the specific outcome by, for example, training a machine learning model (e.g., the machine learning model 120), to predict the behavior profile predicting the specific outcome based at least on the binary feature maps included in the particular segment. Thus, the segmentation engine 110 provides a model trained per segment, which represents a unique behavior profile. As a result, the model 120 may more accurately, reliably, and consistently predict the behavior profile and/or the specific outcome, such as compared to conventional models that make predictions across entire populations.

FIG. 7 depicts a flowchart illustrating a process 700 for segmentation based on zero value features in machine learning. Referring to FIGS. 1-8, one or more aspects of the process 700 may be performed by the segmentation system 100, the segmentation engine 110, other components therein, and/or the like.

At 702, the segmentation engine 110 receives or retrieves a plurality of input feature vectors containing a set of input values. In some implementations, the plurality of input feature vectors are each associated with a different entity. In other implementations, at least some of the plurality of input feature vectors are associated with a same entity. As described herein, an entity may include a customer, an individual, a non-person entity, and/or the like. Each input value of the set of input values corresponds to a behavior or input feature, as described herein. In some implementations, each input value of the set of input values is a zero value indicating an absence of the corresponding behavior or a non-zero value indicating a presence of the corresponding behavior. For example, the input values in the set of input values may have a numeric value that is either zero or a non-zero number.

At 704, the segmentation engine 110 generates a plurality of binary feature maps. Each of the plurality of binary feature maps corresponds to an input feature vector of the plurality of input feature vectors. The plurality of binary feature maps contain a set of feature map values. The set of feature map values include values that are a first binary value and/or a second binary value. The segmentation engine 110 generates each binary feature map by at least converting each input value of the set of input values of the plurality of input feature vectors to the first binary value when the corresponding input value is the zero value (e.g., a zero numeric value) or the second binary value when the corresponding input value is the non-zero value (e.g., a non-zero numeric value).

At 706, the segmentation engine 110 segments the plurality of binary feature maps into a plurality of segments representing behavior profiles. Each segment of the plurality of segments includes at least one subsegment in which the set of feature map values is the same for all binary feature maps in the at least one subsegment.

In some implementations, the segmentation engine 110 segments the plurality of binary feature maps into the plurality of segments by at least determining whether a first subsegment of the at least one subsegment includes a first quantity of binary feature maps (e.g., a segment size) meeting (e.g., is greater than or equal to) a threshold quantity (e.g., a minimum segment size).

In some implementations, the segmentation engine 110 determines the first quantity of binary feature maps meets the threshold quantity. The first subsegment defines a segment of the plurality of segments when the first quantity of binary feature maps meets the threshold quantity. For example, the first subsegment may be the only subsegment in the segment when the first quantity of binary feature maps meets the threshold quantity.

In some implementations, the segmentation engine 110 determines the first quantity of binary feature maps fails to meet the threshold quantity. Based on the determination, the segmentation engine 110 generates a merged segment. The merged segment defines a segment of the plurality of subsegments by at least merging the first subsegment and at least one second subsegment of the at least one subsegment until a total quantity of binary feature maps in the merged subsegment meets the threshold quantity. This ensures that each segment includes a sufficient quantity of sample (e.g., binary feature maps) for improved model predictions.

In some implementations, the at least one second subsegment is selected based on a distance between the at least one second subsegment and the first subsegment, such as based on the input values (e.g., a premutation of the input values). In some implementations, the distance is determined based on an exclusive or operation or other distance metric determination techniques. The distance may indicate a quantity of differing feature map values between the first subsegment and the at least one second subsegment. In this example, the at least one second subsegment is selected such that the distance is minimized. Additionally and/or alternatively, the at least one second subsegment is selected such that the quantity of shared feature map values is a maximum quantity relative to first subsegment and the second subsegment share a maximum quantity of feature map values. Again, the distance is minimized such that the subsegments merged into the merged segment include a maximum quantity of shared behaviors.

In some implementations, the threshold quantity (e.g., minimum segment size) is generated based on a target rate. The threshold quantity may be a multiple of an inverse of the target rate.

At 708, the segmentation engine 110, such as via the machine learning model 120, predicts a behavior profile predicting a specific outcome and/or predicts a specific outcome. The specific outcome may include a negative event or negative entity behavior (e.g., a negative entity transaction behavior) of an entity, including medication diversion, fraud, money laundering, credit risk default, and/or the like. In some implementations, the behavior is a transactional behavior and the predicted behavior profile predicting the specific outcome and/or the predicted specific outcome includes a negative entity behavior of an entity. The predicting may include training a machine learning model, such as the machine learning model 120, to predict the specific outcome based on a segment of the plurality of segments. The machine learning model may be an unsupervised machine learning model, as described herein.

Example Experiments

Figure 8:
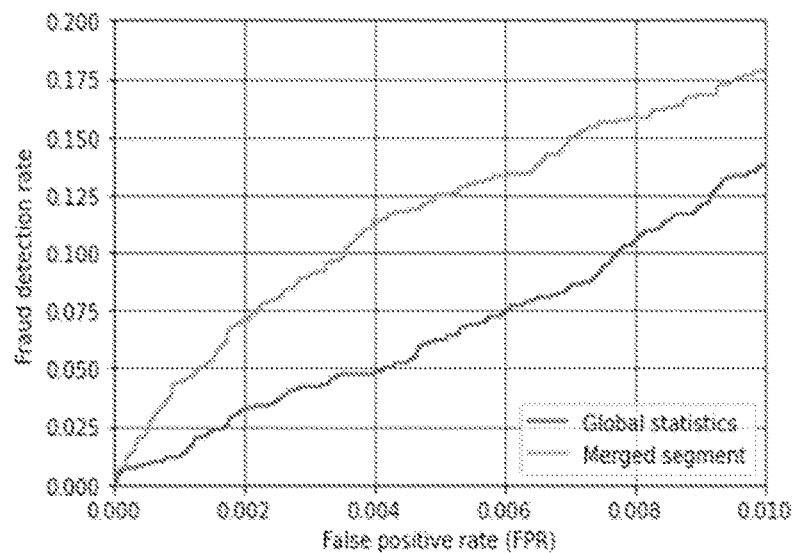
FIG. 8 depicts an example performance evaluation, consistent with implementations of the current subject matter.

FIG. 8 depicts an example performance evaluation, consistent with implementations of the current subject matter. As an example, a fraud detection study was conducted to compare the performance of a model (e.g., the machine learning model 120) trained based on a merged segment compared to a model trained based on an entire population that provides global statistics, in payment card fraud detection. In the study, the historical data of payment card transactions and fraud tags were collected. The minimum segment size approach described herein shows superior performance in fraud detection at both 0.1% and 0.01% false positive rates compared to the model trained based on the entire population. As shown in FIG. 8, the model trained based on the merged segment shows a relative improvement of 179% in fraud detection at a 0.1% target false positive rate and a relative improvement of 81% at a 0.01% target false positive rate over the model trained based on the entire population. The statistical distribution has been improved significantly by employing a minimum segment size set by Equation 1, resulting in behavior-similar segments with sufficient statistics to accurately account for differences compared to the global statistics of the entire population.

Figure 9:
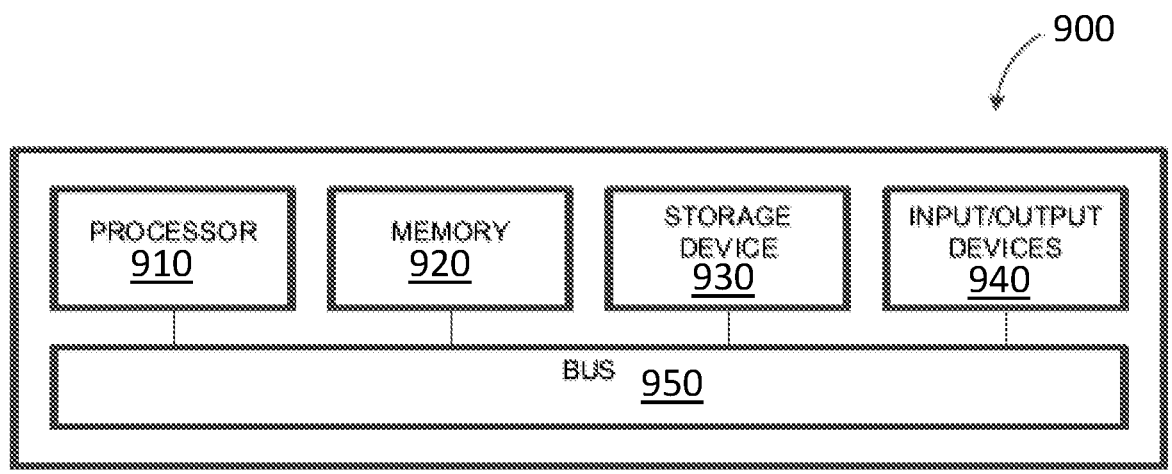
FIG. 9 depicts a block diagram illustrating an example of a computing system, consistent with implementations of the current subject matter.

FIG. 9 depicts a block diagram illustrating a computing system 900 consistent with implementations of the current subject matter. Referring to FIGS. 1-9, the computing system 900 can be used to implement the segmentation system 100, the segmentation engine 110, the machine learning model 120, and/or any components therein.

As shown in FIG. 9, the computing system 900 can include a processor 910, a memory 920, a storage device 930, and input/output devices 940. The processor 910, the memory 920, the storage device 930, and the input/output devices 940 can be interconnected via a system bus 950. The computing system 900 may additionally or alternatively include a graphic processing unit (GPU), such as for image processing, and/or an associated memory for the GPU. The GPU and/or the associated memory for the GPU may be interconnected via the system bus 950 with the processor 910, the memory 920, the storage device 930, and the input/output devices 940. The memory associated with the GPU may store one or more images described herein, and the GPU may process one or more of the images described herein. The GPU may be coupled to and/or form a part of the processor 910. The processor 910 is capable of processing instructions for execution within the computing system 900. Such executed instructions can implement one or more components of, for example, the segmentation system 100, the segmentation engine 110, the machine learning model 120, and/or the like. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
   at least one data processor; and
   at least one memory storing instructions, which when executed by the at least one processor result in operations comprising:
   receiving a plurality of input feature vectors containing a set of input values, wherein each input value of the set of input values corresponds to a behavior, and wherein each input value of the set of input values is a zero value indicating an absence of the corresponding behavior or a non-zero value indicating a presence of the corresponding behavior;
   generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value;
   segmenting the plurality of binary feature maps into a plurality of segments representing behavior profiles, wherein each segment of the plurality of segments includes at least one subsegment in which the set of feature map values is the same for all binary feature maps in the at least one subsegment; and
   predicting, based on a segment of the plurality of segments, a behavior profile representing a specific outcome.

2. The system of claim 1, wherein the segmenting includes: determining whether a first subsegment of the at least one subsegment includes a first quantity of binary feature maps meeting a threshold quantity.

3. The system of claim 2, wherein the first subsegment defines a segment of the plurality of segments when the first quantity of binary feature maps meets the threshold quantity.

4. The system of claim 2, wherein the segmenting further includes: determining the first quantity of binary feature maps fails to meet the threshold quantity; and generating a merged segment defining a segment of the plurality of segments by at least merging the first subsegment and at least one second subsegment of the at least one subsegment until a total quantity of binary feature maps in the merged segment meets the threshold quantity.

5. The system of claim 4, wherein the at least one second subsegment is selected based on a distance between the at least one second subsegment and the first subsegment based on the feature map values.

6. The system of claim 5, wherein the distance indicates a quantity of differing feature map values between the first subsegment and the at least one second subsegment, and wherein the at least one second subsegment is selected such that the distance is minimized.

7. The system of claim 5, wherein the distance is determined based on an exclusive or operation.

8. The system of claim 4 wherein the at least one second subsegment is selected such that a quantity of shared feature map values is a maximum quantity relative to first subsegment and the second subsegment share a maximum quantity of feature map values.

9. The system of claim 4, wherein the threshold quantity is generated based on a target rate.

10. The system of claim 9, wherein the threshold quantity is a multiple of an inverse of the target rate.

11. The system of claim 1, wherein the plurality of input feature vectors are associated with different entities.

12. The system of claim 1, wherein the predicting includes training, based at least on the binary feature maps included in the segment, a machine learning model to predict the specific outcome.

13. The system of claim 12, wherein the machine learning model is an unsupervised machine learning model.

14. The system of claim 12, wherein the behavior is a transactional behavior and the predicted specific outcome includes a negative entity transaction behavior of an entity.

15. A computer implemented method, comprising:
   receiving a plurality of input feature vectors containing a set of input values, wherein each input value of the set of input values corresponds to a behavior, and wherein each input value of the set of input values is a zero value indicating an absence of the corresponding behavior or a non-zero value indicating a presence of the corresponding behavior;
   generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value;
   segmenting the plurality of binary feature maps into a plurality of segments representing behavior profiles, wherein each segment of the plurality of segments includes at least one subsegment in which the set of feature map values is the same for all binary feature maps in the at least one subsegment; and
   predicting, based on a segment of the plurality of segments, a behavior profile representing a specific outcome.

16. The method of claim 15, wherein the segmenting includes: determining whether a first subsegment of the at least one subsegment includes a first quantity of binary feature maps meeting a threshold quantity.

17. The method of claim 16, wherein the first subsegment defines a segment of the plurality of segments when the first quantity of binary feature maps meets the threshold quantity.

18. The method of claim 16, wherein the segmenting further includes: determining the first quantity of binary feature maps fails to meet the threshold quantity; and generating a merged segment defining a segment of the plurality of segments by at least merging the first subsegment and at least one second subsegment of the at least one subsegment until a total quantity of binary feature maps in the merged segment meets the threshold quantity.

19. The method of claim 18, wherein the at least one second subsegment is selected based on a distance between the at least one second subsegment and the first subsegment based on the feature map values.

20. A non-transitory computer-readable medium storing instructions, which when executed by at least one data processor, result in operations comprising:
   receiving a plurality of input feature vectors containing a set of input values, wherein each input value of the set of input values corresponds to a behavior, and wherein each input value of the set of input values is a zero value indicating an absence of the corresponding behavior or a non-zero value indicating a presence of the corresponding behavior;

generating a plurality of binary feature maps containing a set of feature map values including a first binary value and/or a second binary value, by at least converting each input value of the set of input values of the plurality of input feature vectors to the first binary value when the corresponding input value is the zero value or the second binary value when the corresponding input value is the non-zero value;

segmenting the plurality of binary feature maps into a plurality of segments representing behavior profiles, wherein each segment of the plurality of segments includes at least one subsegment in which the set of feature map values is the same for all binary feature maps in the at least one subsegment; and predicting, based on a segment of the plurality of segments, a behavior profile representing a specific outcome.

* * * * *